United States Patent
Barnhart

(10) Patent No.: US 10,391,556 B2
(45) Date of Patent: Aug. 27, 2019

(54) POWDER TRANSFER APPARATUS AND METHOD FOR ADDITIVE MANUFACTURING

(71) Applicant: General Electric Compnay, Schenectady, NY (US)

(72) Inventor: David Richard Barnhart, Jefferson, OH (US)

(73) Assignee: General Electric Company, Shenectady, NY (US)

( * ) Notice: Subject to any disclaimer, the term of this patent is extended or adjusted under 35 U.S.C. 154(b) by 607 days.

(21) Appl. No.: 14/698,190

(22) Filed: Apr. 28, 2015

(65) Prior Publication Data

US 2016/0318102 A1     Nov. 3, 2016

(51) Int. Cl.

| | | |
|---|---|---|
| *B29C 64/153* | (2017.01) | |
| *B22F 3/105* | (2006.01) | |
| *B28B 1/00* | (2006.01) | |
| *B33Y 30/00* | (2015.01) | |
| *B33Y 40/00* | (2015.01) | |
| *B29C 64/20* | (2017.01) | |
| *B28B 3/02* | (2006.01) | |

(Continued)

(52) U.S. Cl.
CPC ............ *B22F 3/1055* (2013.01); *B28B 1/001* (2013.01); *B28B 3/02* (2013.01); *B28B 13/023* (2013.01); *B29C 64/153* (2017.08); *B29C 64/20* (2017.08); *B29C 64/35* (2017.08); *B33Y 30/00* (2014.12); *B33Y 40/00* (2014.12); *B22F 2003/1056* (2013.01); *B22F 2998/10* (2013.01); *B22F 2999/00* (2013.01); *B29C 64/245* (2017.08); *B29K 2101/00* (2013.01); *B29K 2105/251* (2013.01); *B33Y 10/00* (2014.12); *Y02P 10/295* (2015.11)

(58) Field of Classification Search
CPC ... B22F 3/1055; B29C 67/0077; B29C 64/00; B29C 64/10; B29C 64/153; B29C 64/20; B33Y 10/00; B33Y 30/00; B29K 2105/251; B22D 41/22
USPC ....... 425/174.4, 375; 222/590, 600; 264/497
See application file for complete search history.

(56) References Cited

U.S. PATENT DOCUMENTS

| | | |
|---|---|---|
| 6,554,600 B1 | 4/2003 | Hofmann et al. |
| 7,491,912 B1 | 2/2009 | Check |
| | (Continued) | |

FOREIGN PATENT DOCUMENTS

WO      2014009376 A1     1/2014

OTHER PUBLICATIONS

European Search Report and Opinion issued in connection with related EP Application No. 16167177.1 dated Nov. 11, 2016.
GE Related Case Form.

*Primary Examiner* — Robert C Dye
*Assistant Examiner* — Sedef E Paquette
(74) *Attorney, Agent, or Firm* — General Electric; Brian Overbeck

(57) ABSTRACT

An additive manufacturing apparatus includes: a table defining a planar worksurface having an opening therein, the opening communicating with a build enclosure having a vertically slidable build platform therein; and a first slide having a first powder transfer window therein, the first slide being moveable across the worksurface between a loading position away from the opening where the first powder transfer window is exposed to receive powder, and a supply position where the first powder transfer window is aligned over the opening.

14 Claims, 3 Drawing Sheets

(51) Int. Cl.
  *B28B 13/02*   (2006.01)
  *B29C 64/35*   (2017.01)
  *B29K 101/00*   (2006.01)
  *B29K 105/00*   (2006.01)
  *B33Y 10/00*   (2015.01)
  *B29C 64/245*   (2017.01)

(56) References Cited

U.S. PATENT DOCUMENTS

| | | | |
|---|---|---|---|
| 7,820,241 B2* | 10/2010 | Perret | B22F 3/1055 |
| | | | 264/401 |
| 8,070,474 B2 | 12/2011 | Abe et al. | |
| 8,550,802 B2 | 10/2013 | Fuwa et al. | |
| 8,568,124 B2 | 10/2013 | Brunermer | |
| 8,707,474 B2 | 4/2014 | Rachwal | |
| 2004/0084814 A1* | 5/2004 | Boyd | B29C 64/153 |
| | | | 264/497 |
| 2006/0219315 A1* | 10/2006 | Cox | B65G 53/22 |
| | | | 141/67 |
| 2007/0026145 A1 | 2/2007 | Lindemann et al. | |
| 2007/0126157 A1 | 6/2007 | Bredt | |
| 2010/0006228 A1* | 1/2010 | Abe | B33Y 30/00 |
| | | | 156/356 |
| 2010/0101490 A1* | 4/2010 | Bokodi | B29C 35/02 |
| | | | 118/500 |
| 2011/0052386 A1 | 3/2011 | Schoonover et al. | |
| 2011/0135952 A1 | 6/2011 | Morris et al. | |
| 2011/0223349 A1* | 9/2011 | Scott | B22F 3/1055 |
| | | | 427/532 |
| 2011/0311389 A1 | 12/2011 | Ryan et al. | |
| 2012/0222306 A1 | 9/2012 | Mittendorf et al. | |
| 2015/0258744 A1 | 9/2015 | Muller et al. | |
| 2017/0144372 A1* | 5/2017 | Kuesters | B29C 67/0077 |

* cited by examiner

POWDER TRANSFER APPARATUS AND METHOD FOR ADDITIVE MANUFACTURING

BACKGROUND OF THE INVENTION

This invention relates generally to additive manufacturing and more particularly to handing mechanisms for additive manufacturing.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

Currently, powder bed technologies have demonstrated the best resolution capabilities of prior art metal additive manufacturing technologies. However, since the build needs to take place in the powder bed, conventional machines use a large amount of powder, for example a powder load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Furthermore, currently available additive manufacturing systems are geared for prototyping and very low volume manufacturing. Considerable differences can exist from part-to-part. Some elements of current systems are cumbersome to handle due to weight and can require excessive manual, hands-on interaction.

Accordingly, there remains a need for an additive manufacturing apparatus and method that can produce parts at a high volume with consistent quality.

BRIEF DESCRIPTION OF THE INVENTION

This need is addressed by the present invention, which provides a powder transfer system incorporating one or more slides that are laterally moveable to transfer a fixed quantity of powder from a powder supply system to a build enclosure.

According to one aspect of the invention, an additive manufacturing apparatus includes: a table defining a planar worksurface having an opening therein, the opening communicating with a build enclosure having a vertically slidable build platform therein; and a first slide having a first powder transfer window therein, the first slide being moveable across the worksurface between a loading position away from the opening where the first powder transfer window is exposed to receive powder, and a supply position where the first powder transfer window is aligned over the opening.

According to another aspect of the invention, the apparatus further includes a second slide having a second powder transfer window therein, the second slide being positioned on top of the first slide and moveable between a loading position away from the opening where the second powder transfer window is exposed to receive powder, and a supply position where the second powder transfer window is aligned over the opening.

According to another aspect of the invention, the apparatus further includes a compactor having a compactor piston selectively extendable through the first powder transfer window so as to compact powder contained in the build enclosure.

According to another aspect of the invention, the apparatus further includes a directed energy source configured to melt and consolidate powder exposed on the build platform.

According to another aspect of the invention, the apparatus further includes a powder handling system having a powder supply portion configured to supply powder to the first powder transfer window in the loading position, and a powder recovery portion configured to receive unused powder scraped off of the build platform by the first slide.

According to another aspect of the invention, the apparatus further includes: a second slide positioned on top of the first slide and moveable between a loading position away from the opening where the second powder transfer window is exposed to receive powder, and a supply position where the second powder transfer window is aligned over the opening; a compactor platform lying on top of the second slide and having a compactor opening aligned with the opening of the worksurface, an powder supply opening laterally spaced-away from the compactor opening; a compactor disposed on the compactor platform, the compactor including a compactor piston selectively extendable through the first powder transfer window so as to compact powder contained in the build enclosure; a powder handling system having a powder supply portion positioned on the compactor platform in flow communication with the powder supply opening, a powder recovery portion positioned below a powder recovery opening of the table which is aligned with the powder supply opening of the compactor platform; and a directed energy source configured to melt and consolidate powder exposed on the build platform.

According to another aspect of the invention, the compactor is laterally moveable between a non-use position away from the opening, and a use position aligned with the opening.

According to another aspect of the invention, the powder recovery portion includes a valve positioned beneath the powder recovery opening and moveable between a closed position which prevents powder from flowing and an open position which permits powder to flow.

According to another aspect of the invention, in the loading position, the first and second powder transfer windows are aligned beneath the powder supply portion, and in the supply position, the first and second powder transfer windows are aligned over the opening.

According to another aspect of the invention, a method of making a part includes the steps of: using an apparatus having: a table defining a planar worksurface and an opening therein; and a first moveable slide including a first powder transfer window; loading powder into the first powder transfer window in a loading position away from the opening, and traversing the table with the first slide from a loading position to a supply position where the first powder transfer window is aligned over the opening; supplying powder from the first powder transfer window onto a build platform exposed by the opening; moving the first slide back to the loading position so as to scrape the powder on the build platform to form a layer increment of powder; directing a beam from a directed energy source to fuse the layer increment of powder in a pattern corresponding to a crosssectional layer of the part; lowering the build platform by the layer increment; and repeating in a cycle the steps of loading, supplying, moving, fusing, and lowering to build up the part in a layer-by-layer fashion.

According to another aspect of the invention, the method further includes the step of compacting the powder after it is supplied to the build platform.

According to another aspect of the invention, the method further includes the steps of: using a powder supply portion of a powder handling system to load powder into the first powder transfer window while the first slide is in the loading position; and using a powder recovery portion of the powder handling system to receive powder scraped by the first slide.

According to another aspect of the invention, the method further includes closing a valve positioned beneath the powder supply portion to block flow of powder out of the first slide while loading powder into the first powder transfer window.

According to another aspect of the invention, the method further includes opening the valve to permit powder to flow out of the first slide and into the powder recover portion after scraping the powder.

According to another aspect of the invention, the apparatus further includes a second slide having a second powder transfer window therein, and the method further includes the steps of: loading powder into the second powder transfer window simultaneously with loading powder into the first powder transfer window; moving the second slide in unison with the first slide across the table from the loading position to the supply position; supplying powder from the second powder transfer window onto the build platform simultaneously with supplying powder from the first powder transfer window; compacting the powder supplied to the build platform; and moving the second slide back to the loading position so as to scrape powder remaining on the first slide, after the first slide has scraped the powder on the build platform.

According to another aspect of the invention, the method further includes the steps of: using a powder supply portion of a powder transfer system to load powder into the first and second powder transfer windows; and using a powder recovery portion of a powder transfer system to receive powder scraped by the first and second slides.

According to another aspect of the invention, the method further includes compacting the powder after it is supplied to the build platform.

According to another aspect of the invention, the step of compaction includes: moving the compactor laterally from a non-use position away from the opening to a use position aligned over the first and second powder transfer windows and the opening; extending a compactor piston of the compactor into the second powder transfer window to compact the supplied powder; maintaining the compactor piston in the second powder transfer window as the first slide scrapes the powder to form the layer increment of powder; retracting the compactor piston from the second powder transfer window once the first slide has formed the layer increment of powder; and moving the compactor from the use position to the non-use position prior to moving second slide back to the loading position.

According to another aspect of the invention, an additive manufacturing apparatus includes: a table defining a planar worksurface having an opening therein, the opening communicating with a build enclosure having a vertically slidable build platform therein; and a first slide having a first powder transfer window therein, the first slide being moveable across the worksurface between a loading position away from the opening where the first powder transfer window is exposed to receive powder, and a supply position where the first powder transfer window is aligned over the opening.

According to another aspect of the invention, the apparatus further includes a second slide having a second powder transfer window therein, the second slide being positioned on top of the first slide and moveable between a loading position away from the opening where the second powder transfer window is exposed to receive powder, and a supply position where the second powder transfer window is aligned over the opening.

According to another aspect of the invention, the apparatus further includes compacting means for compacting powder contained in the build enclosure.

According to another aspect of the invention, the compacting means comprises a compactor having a compactor piston selectively extendable through the first powder transfer window so as to compact powder contained in the build enclosure.

According to another aspect of the invention, the apparatus further includes a directed energy source configured to melt powder exposed on the build platform.

According to another aspect of the invention, the apparatus further includes powder handling means for supplying powder to the first powder transfer window for recovering unused powder.

According to another aspect of the invention, the powder handling means include a powder handling system having a powder supply portion configured to supply powder to the first powder transfer window in the loading position, and a powder recovery portion configured to receive unused powder.

According to another aspect of the invention, the apparatus further includes: a second slide positioned on top of the first slide and moveable between a loading position away from the opening where the second powder transfer window is exposed to receive powder, and a supply position where the second powder transfer window is aligned over the opening; a compactor platform lying on top of the second slide and having a compactor opening aligned with the opening of the worksurface, and a powder supply opening laterally spaced-away from the compactor opening; a compactor disposed on the compactor platform, the compactor including a compactor piston selectively extendable through the first powder transfer window so as to compact powder contained in the build enclosure; a powder handling system having a powder supply portion positioned on the compactor platform in flow communication with the powder supply opening, a powder recovery portion positioned below a powder recovery opening of the table which is aligned with the powder supply opening of the compactor platform; and a directed energy source configured to melt powder exposed on the build platform.

According to another aspect of the invention, the compactor is laterally moveable between a non-use position away from the opening, and a use position aligned with the opening.

According to another aspect of the invention, the powder recovery portion includes a valve positioned beneath the powder recovery opening and moveable between a closed position which prevents powder from flowing and an open position which permits powder to flow.

According to another aspect of the invention, in the loading position, the first and second powder transfer windows are aligned beneath the powder supply portion, and in the supply position, the first and second powder transfer windows are aligned over the opening

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
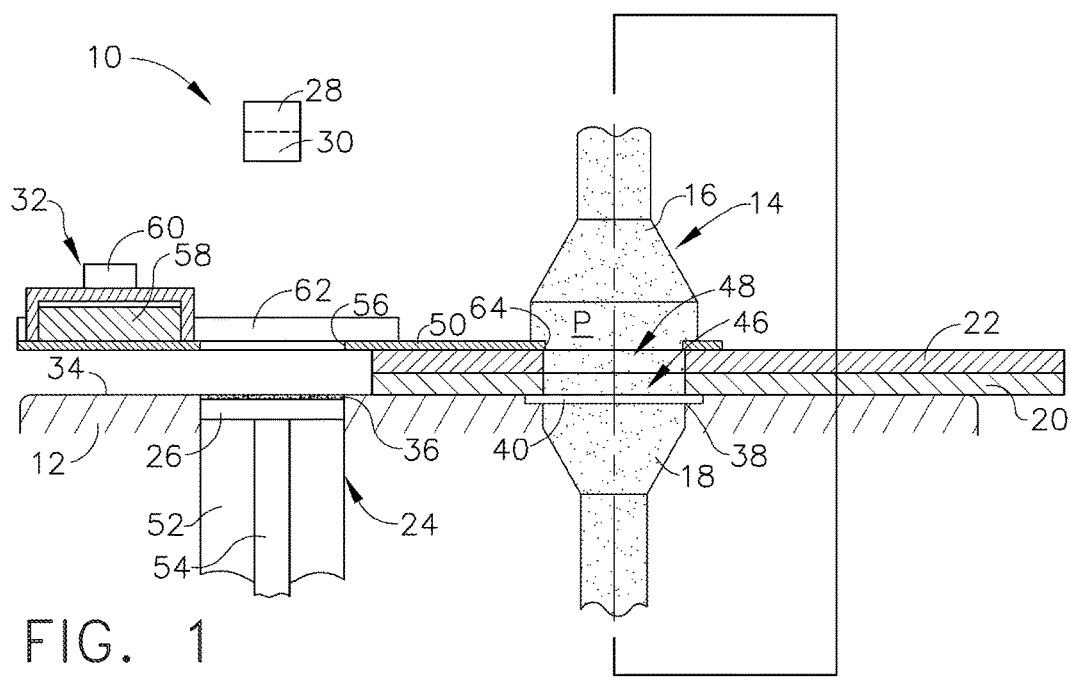
FIG. 1 is a schematic of an additive manufacturing apparatus constructed according to an aspect of the invention in a load position.

Referring to the drawings wherein identical reference numerals denote the same elements throughout the various views, FIG. 1 illustrates an additive manufacturing apparatus 10 for carrying out the manufacturing method of the present invention. The basic components are a table 12, a closed loop powder handling system 14 having a powder supply portion 16 and a powder recovery portion 18, first and second slides 20 and 22, a build enclosure 24 surrounding a build platform 26, a directed energy source 28, a beam steering apparatus 30, and a compactor 32. Each of these components will be described in more detail below.

The table 12 is a rigid structure providing a planar worksurface 34. The worksurface 34 is coplanar with and defines a virtual workplane. In the illustrated example it includes an opening 36 communicating with the build enclosure 24 and exposing the build platform 26 and a powder recovery opening 38 communicating with the powder recovery portion 18 of the powder handling system 14. Optionally, an actuated door 40 or valve is positioned within the powder recovery opening 38 to open and close the powder recovery opening 38. The valve 40 may be actuated by pneumatic or hydraulic cylinders, ballscrew or linear electric actuators, and so forth.

Figure 2:
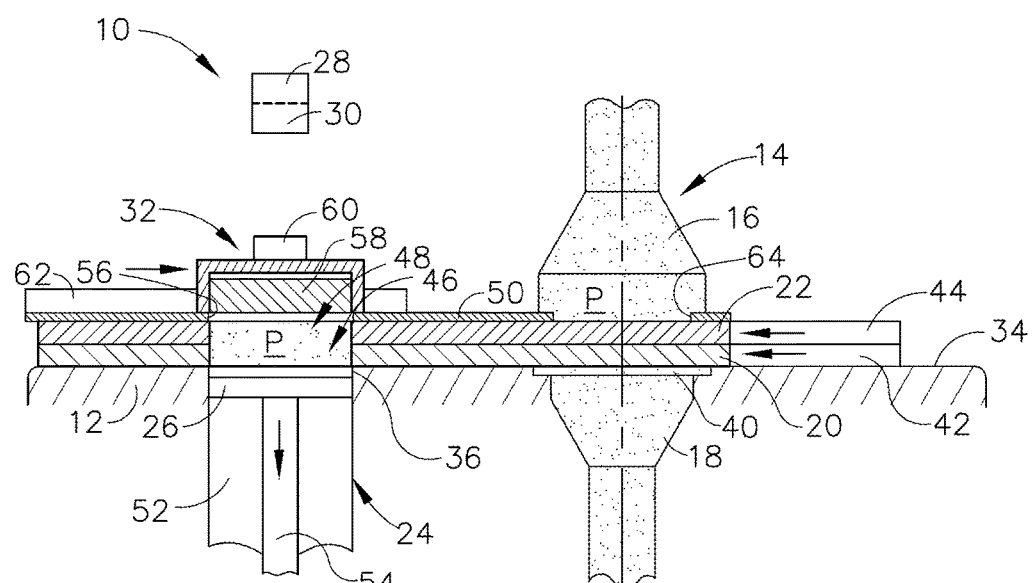
FIG. 2 is a schematic of the additive manufacturing apparatus of FIG. 1 in a supply position.

The first and second slides 20 and 22 are rigid, plate-like structures that are actuated independently of one another by actuators 42 and 44, respectively, operable to selectively move the first and second slides 20 and 22 between a loading position, FIG. 1, and a supply position, FIG. 2. As illustrated, first slide 20 lies on the worksurface 34 and includes a first powder transfer window 46 and second slide 22 lies on the first slide 20 between the first slide 20 and a compactor platform 50 and includes a second powder transfer window 48. The first slide 20 scrapes across the worksurface 34 and the second slide 22 scrapes across the first slide 20. Actuators 42 and 44 are depicted schematically in FIG. 2, with the understanding devices such as pneumatic or hydraulic cylinders, ballscrew or linear electric actuators, and so forth, may be used for this purpose.

The powder handling system 14 may be a closed-loop. The powder supply portion 16 drops or feeds powder "P" into the first and second powder transfer windows 46 and 48 when the first and/or second powder transfer windows are aligned with the powder supply portion 16 (loading position). Powder recovered in the powder recovery portion 18 is recycled back to the powder supply portion 16. Suitable means for moving the powder P to the supply portion 16 and from the powder recovery portion 18 are known in the prior art and are beyond the scope of the present invention. As nonlimiting examples, they may be pneumatic or mechanical in nature. It should be appreciated that the powder used in the current invention may be any power capable of being loaded onto a build platform and fused using radiant energy. For example, the powder may be a metallic, polymeric, or ceramic.

The build platform 26 is a plate-like structure that is vertically slidable in a build chamber 52 of the build enclosure 24 below the opening 36. The build platform is secured to an actuator 54 operable to selectively move the build platform 26 up or down. The actuator 54 is depicted schematically in FIG. 1, with the understanding that devices such as pneumatic or hydraulic cylinders, ballscrew or linear electric actuators, and so forth, may be used for this purpose.

The directed energy source 28 may comprise any known device operable to generate a beam of suitable power and other operating characteristics to melt and fuse the powder during the build process, described in more detail below. For example, the directed energy source 28 may be a laser. Other directed-energy sources such as electron beam guns are suitable alternatives to a laser.

The beam steering apparatus 30 comprises one or more mirrors, prisms, and/or lenses and provided with suitable actuators, and arranged so that a beam "B" from the directed energy source 28 can be focused to a desired spot size and steered to a desired position in an X-Y plane coincident with the worksurface 34.

Figure 3:
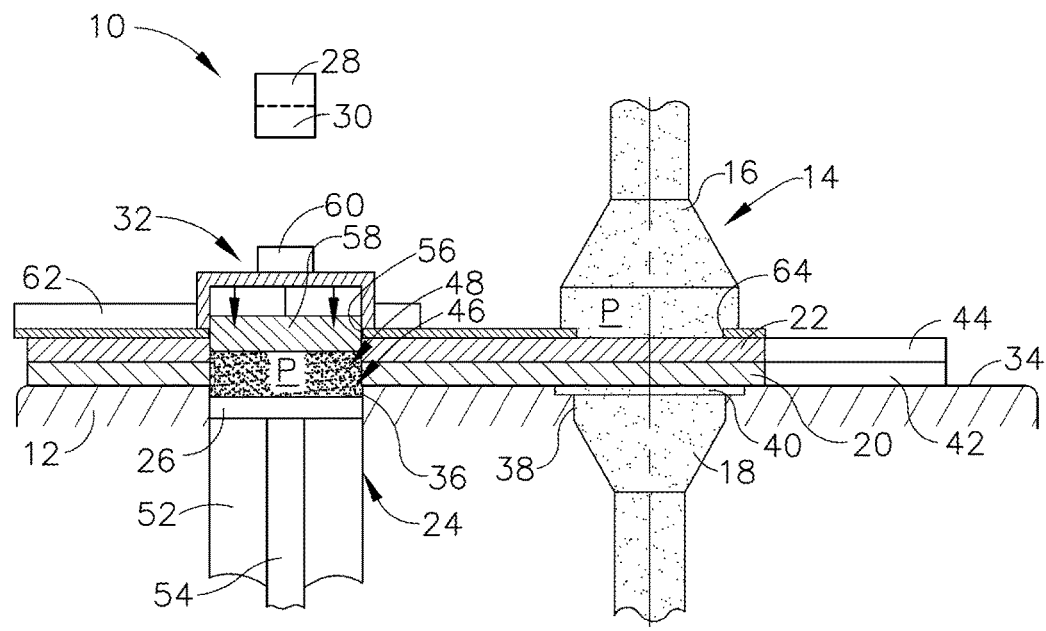
FIG. 3 is a schematic of the additive manufacturing apparatus of FIG. 2 showing powder being compacted.

The compactor 32 lies on the compactor platform 50 and is configured to compact powder supplied by the first and second slides 20 and 22 to the build platform 26. The compactor platform 50 includes a compactor opening 56 aligned with the opening 36 to allow a compactor piston 58, such as a piston, of the compactor 32 to extend through the compactor opening 56 and compact the supplied powder and a powder supply opening 64 to allow powder to flow from the powder supply portion 16 into the first and second powder transfer windows 46 and 48. Actuator 60 is configured to actuate the compactor piston 58 between a retracted position, FIG. 2, and an extended position, FIG. 3. Actuator 62 is configured to move compactor 32 along compactor platform 50 laterally between a non-use position away from the opening 36, FIG. 1, and a use position aligned with the opening 36, FIG. 2.

The build process for building a part using the apparatus 10 described above is as follows. The build platform 20 is moved to an initial high position by actuator 54, valve 40 (if present) is maintained in a closed position, and first and second slides 20 and 22 are moved to the loading position such that first and second powder transfer windows 46 and 48 are aligned with the powder supply opening 64 and powder supply portion 16, FIG. 1. The initial high position is located below the worksurface 34 by a selected layer increment. The layer increment affects the speed of the additive manufacturing process and the resolution of the part. As an example, the layer increment may be about 10 to 50 micrometers (0.0003 to 0.002 in.).

With the first and second powder transfer windows 46 and 48 aligned with the powder supply portion 16, powder is dropped or otherwise fed from the powder supply portion 16 into the first and second powder supply windows 46 and 48. If used, the valve 40 keeps the powder from free falling from the powder supply portion 16 through the first and second powder supply windows 46 and 48 and into powder recovery portion 18. Depending on the specific type of powder supply and recovery system used, it is possible that the powder recovery portion 18 would continuously contain a quantity of powder therein, in which case the valve 40 would not be necessary. Actuators 42 and 44 move the first and second slides 20 and 22 in unison to the supply position, FIG. 2, where powder P is then deposited over the build platform 20. Actuator 62 moves compactor 32 from the non-use position to the use position such that compactor piston 58 is aligned with compactor opening 56, FIG. 2. Actuator 60 moves compactor piston 58 vertically downward from the retracted position to the extended position to compact the powder contained in the first and second supply windows 46 and 48 onto the build platform 26, FIG. 3.

Figure 4:
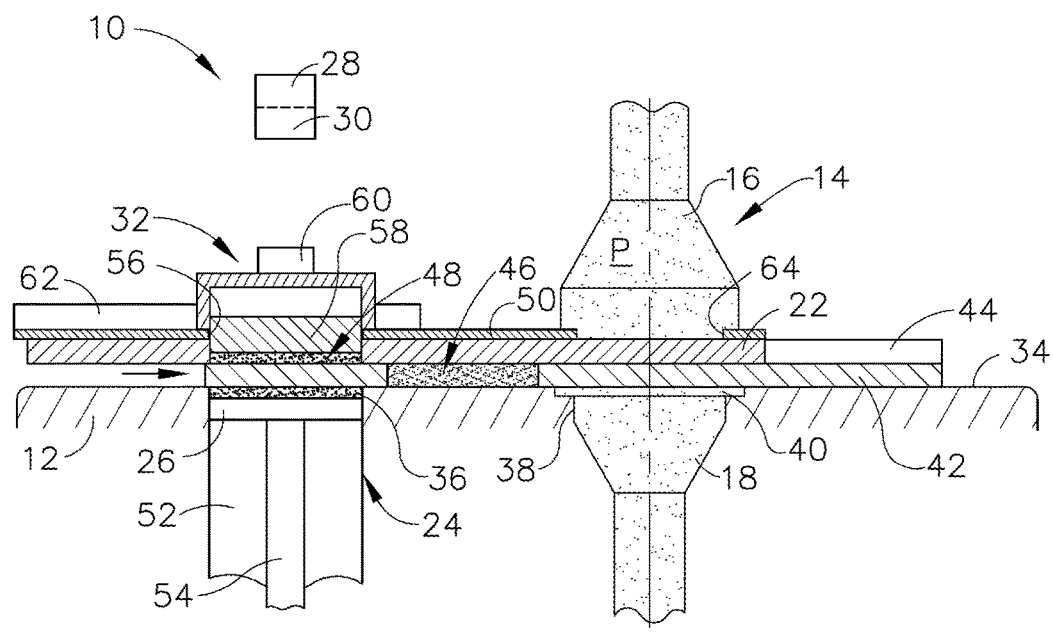
FIGS. 4 and 5 are schematics of the additive manufacturing apparatus of FIG. 3 showing the compacted powder being scraped.
Figure 5:
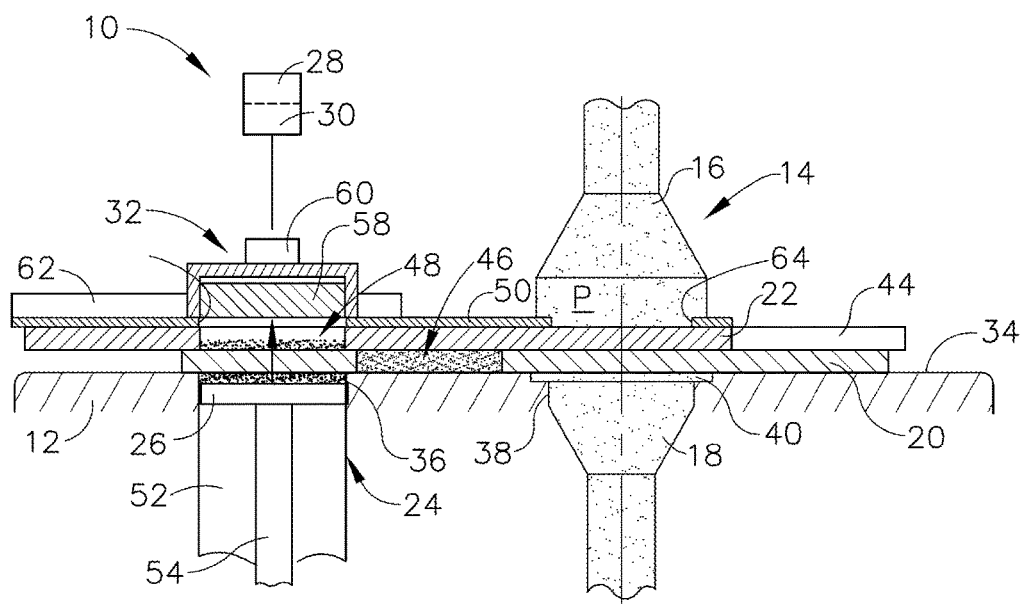

Actuator 42 begins to move first slide 20 from the supply position back to the loading position, FIG. 4, and actuator 60 moves compactor piston 58 vertically upward from the extended position to the refracted position, FIG. 5, thereby removing the compactor piston 58 from interference with the second slide 22. Once the compactor piston 58 is moved to the retracted position and before the first slide 20 has completely moved to the loading position, actuator 44 moves the second slide 22 from the supply position back to the loading position and actuator 62 moves the compactor 32 from the use position to the non-use position, FIG. 6.

As illustrated in FIGS. 4 and 5, when moving from the supply position to the loading position, the first and second slides 20 and 22 scrape across the worksurface 34 to remove unnecessary powder from the build platform 26. The unnecessary powder is contained in the first and second powder supply windows 46 and 48. When the first and second supply windows 46 and 48 are aligned with powder recovery opening 38, the valve 40 (if present) is opened and the unnecessary powder is dropped into the powder recovery portion 18 for recycling. Once the unnecessary powder is dropped into the powder recovery portion 18, the valve 40 closes and the first and second power supply windows 46 and 48 are re-loaded with powder P. As noted above, depending on the specific means used to supply and recover powder P, the valve 40 might not be needed, in which case the unnecessary power P simply flows through the powder recover opening 38.

Figure 6:
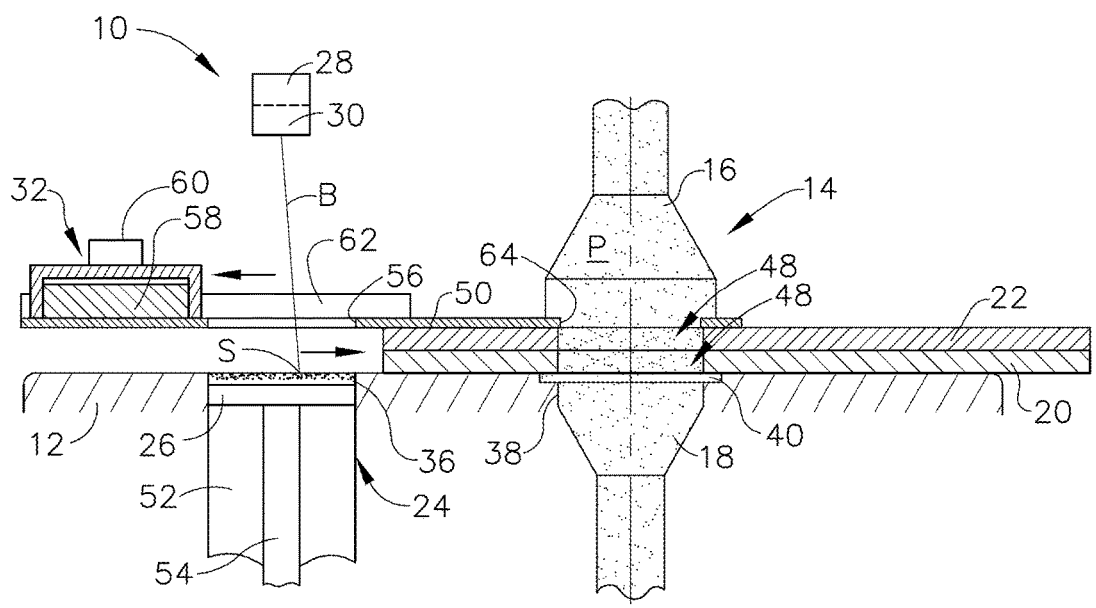
FIG. 6 is a schematic of the additive manufacturing apparatus of FIG. 5 showing the scraped powder being melted by a directed energy source.

With the compactor 32 in the non-use position and first and second slides 20 and 22 in the loading position, the directed energy source 28 is used to melt a two-dimensional cross-section or layer of a part being built, FIG. 6. The directed energy source 28 emits a beam "B" and the beam steering apparatus 30 is used to steer the focal spot "S" of the beam B over the exposed powder surface in an appropriate pattern. The exposed layer of the powder P is heated by the beam B to a temperature allowing it to melt, flow, and consolidate. This step may be referred to as fusing the powder P.

The build platform 26 is then moved vertically downward by the layer increment, and another layer of powder P is applied in a similar thickness, as described above with reference to FIGS. 1-5. The directed energy source 28 again emits a beam B and the beam steering apparatus 30 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer, FIG. 6.

This cycle of moving the build platform 20, supplying powder P, compacting powder P, scraping, and then melting the powder P is repeated until the entire part is complete.

In the alternative, an additive manufacturing process could be carried out using a simplified version of the apparatus 10 described above. For example, the second slider 22 could be eliminated and powder could be transferred from the powder handling system 14 to the build chamber 52, and subsequently scraped, using only the first slider 20. This may be done with or without the use of the compactor 32. If the compactor 32 is used with a single slider, it would be fully retracted before the first slider 20 was moved to scrape the powder P level.

The apparatus and method described above has several advantages over the prior art. It will eliminate the need for a large power bed to manufacture a small part, with the attendant need to handle large, heavy volumes of powder by hand. It greatly reduces or eliminates the need for manual clean-up of powder after a part build cycle. It is also compatible with a central powder storage and transfer system which facilitates the scaling-up of an additive manufacturing process by using multiple machines in parallel in one facility.

The foregoing has described an additive manufacturing apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An additive manufacturing apparatus, comprising:
    a work surface having an opening therethrough;
    a vertically slidable build platform aligned with the opening such that a surface of the build platform is exposed through the opening;
    a first slide defining a first powder transfer window therethrough and a second slide positioned on top of the first slide and defining a second powder transfer window therethrough, wherein the first slide scrapes across the work surface and the second slide scrapes across the first slide;
    a compactor including a compactor piston movable into alignment with both the opening in the work surface and the surface of the build platform and, when in alignment, is extendable through at least the second of the first and second powder transfer windows so as to compact powder deposited on the build platform;
    a powder handling system having a powder supply portion and a powder recovery portion; and
    a directed energy source configured to melt powder exposed on the build platform, wherein the first and second slides are individually movable between a loading position laterally spaced away from the opening in the work surface and in alignment with the powder supply portion of the powder handling system, the first and second powder transfer windows configured to receive powder when in the loading position, and a supply position where the first and second powder transfer windows are in alignment with the opening in the work surface, the build platform and the compactor, the first and second powder transfer windows configured to deposit powder on the build platform when in the supply position, wherein the first slide comprises a trailing section that maintains a load on compacted powder residing on the build platform as the first slide traverses across the work surface from the supply position to the loading position;

wherein the first and second slides are configured to collect excess powder and transfer said powder to the powder recovery portion; and a compactor platform lying on top of the second slide and having a compactor opening aligned with the opening in the work surface, and a powder supply opening laterally spaced-away from the compactor opening and aligned with the powder supply and powder recovery portions of the powder handling system.

2. The apparatus of claim 1, wherein the compactor is laterally moveable between a non-use position away from the opening in the work surface, and a use position aligned with the opening in the work surface.

3. The apparatus of claim 1, wherein the powder recovery portion includes a valve positioned beneath a powder recovery opening in the work surface and moveable between a closed position which prevents powder from flowing and an open position which permits powder to flow.

4. The apparatus of claim 1, wherein in the loading position, the first and second powder transfer windows are aligned beneath the powder supply portion, and in the supply position, the first and second powder transfer windows are aligned over the opening in the work surface.

5. The apparatus of claim 1, wherein the compactor is extendable through both the first and second powder transfer windows when said windows are in alignment with the build platform.

6. The apparatus of claim 1, further comprising actuators.

7. The apparatus of claim 1, wherein the powder handling system is closed-loop.

8. The apparatus of claim 1, wherein the directed energy source is a laser.

9. The apparatus of claim 1, wherein the directed energy source is an electron beam gun.

10. The apparatus of claim 8, further comprising a beam steering apparatus.

11. The apparatus of claim 10, wherein the beam steering apparatus is configured to focus the beam and/or steer the beam to a desired position in an X-Y plane.

12. The apparatus of claim 1, wherein the apparatus is configured to position the build platform below the work surface by a layer increment.

13. The apparatus of claim 12, wherein the layer increment is about 10 to 50 micrometers.

14. The apparatus of claim 1, wherein the powder is metallic, polymeric, or ceramic.

* * * * *